US010621223B2

(12) United States Patent
Yellin et al.

(10) Patent No.: US 10,621,223 B2
(45) Date of Patent: Apr. 14, 2020

(54) SYSTEMS AND METHODS FOR PRESENTING CONTENT AND REPRESENTATIONS OF CONTENT ACCORDING TO DEVELOPMENTAL STAGE

(71) Applicant: Netflix, Inc., Los Gatos, CA (US)

(72) Inventors: Todd Scot Yellin, Los Gatos, CA (US); Michael Bruza, Saratoga, CA (US)

(73) Assignee: NETFLIX, INC., Los Gatos, CA (US)

( * ) Notice: Subject to any disclaimer, the term of this patent is extended or adjusted under 35 U.S.C. 154(b) by 313 days.

(21) Appl. No.: 14/329,681

(22) Filed: Jul. 11, 2014

(65) Prior Publication Data

US 2016/0012048 A1   Jan. 14, 2016

(51) Int. Cl.
*H04N 21/00* (2011.01)
*G06F 16/00* (2019.01)
(Continued)

(52) U.S. Cl.
CPC ..... *G06F 16/435* (2019.01); *H04N 21/44204* (2013.01); *H04N 21/4532* (2013.01); *H04N 21/4661* (2013.01); *H04N 21/472* (2013.01); *H04N 21/4751* (2013.01); *H04N 21/4858* (2013.01)

(58) Field of Classification Search
CPC ........... G06F 17/30106; G06F 17/2235; G06F 17/30867; G06F 17/30893; G06F 17/30038; G06Q 30/0269; G06Q 50/01; G06Q 30/0255; G06Q 30/0222; H04L 12/1831; H04N 21/4661; H04N 21/44204; H04N 21/4751; H04N 21/4858; H04N 21/4532; H04N 21/472
See application file for complete search history.

(56) References Cited

U.S. PATENT DOCUMENTS 5,823,788 A * 10/1998 Lemelson ................ G09B 7/04
                                                    273/432
6,366,300 B1 * 4/2002 Ohara .................. G05B 19/056
                                                    700/83
(Continued)

FOREIGN PATENT DOCUMENTS

WO      WO 02/35498    *  5/2002

*Primary Examiner* — Srirama Channavajjala
(74) *Attorney, Agent, or Firm* — Artegis Law Group, LLP

(57) ABSTRACT

Increasingly, children are consuming digital content on computers, laptops, tablets, and even smartphones. The sheer volume of content available to children can be daunting for parents to manage and filter for their children. Primitive filtering mechanisms based on a target audience age can be used to eliminate some content based on a child's chronological age. However, children develop at different rates so that even children of the same chronological age can have different developmental stages and so have different preferences for content they consume. Systems and methods described herein provide children with access to developmental stage-appropriate content in a developmental stage-appropriate user interface. The developmental stage-appropriate interface includes representations of the content that are developmental stage-appropriate and surrounding elements that are also developmental stage-appropriate. The user interface can include or not include functional elements based on the developmental stage of the user.

19 Claims, 11 Drawing Sheets

(51) Int. Cl.
*G06F 16/435* (2019.01)
*H04N 21/466* (2011.01)
*H04N 21/442* (2011.01)
*H04N 21/475* (2011.01)
*H04N 21/485* (2011.01)
*H04N 21/45* (2011.01)
*H04N 21/472* (2011.01)

(56) References Cited

U.S. PATENT DOCUMENTS

| | | | | |
|---|---|---|---|---|
| 6,755,659 | B2 * | 6/2004 | LoSasso | G06Q 10/06398 434/219 |
| 8,903,834 | B2 * | 12/2014 | Ciancutti | 707/748 |
| 2002/0055089 | A1 * | 5/2002 | Scheirer | G09B 7/02 434/350 |
| 2004/0067469 | A1 * | 4/2004 | Rogan | A63F 13/12 434/107 |
| 2006/0015902 | A1 * | 1/2006 | Matsuura | H04N 7/17318 725/46 |
| 2006/0172274 | A1 * | 8/2006 | Nolasco | G09B 7/02 434/350 |
| 2007/0250901 | A1 * | 10/2007 | McIntire | H04N 7/17318 725/146 |
| 2007/0281285 | A1 * | 12/2007 | Jayaweera | G09B 7/02 434/156 |
| 2008/0033725 | A1 * | 2/2008 | Peak | G06F 17/30038 704/260 |
| 2009/0162822 | A1 * | 6/2009 | Strachan | G06F 17/30056 434/309 |
| 2010/0146443 | A1 * | 6/2010 | Zuckerberg | G06F 17/30867 715/810 |
| 2011/0065082 | A1 * | 3/2011 | Gal | G09B 7/02 434/365 |
| 2011/0167342 | A1 * | 7/2011 | de la Pena | G06F 3/0488 715/702 |
| 2012/0122066 | A1 * | 5/2012 | Dohring | G09B 5/06 434/308 |
| 2013/0132861 | A1 * | 5/2013 | Kienzle | G06Q 10/10 715/753 |

* cited by examiner

SYSTEMS AND METHODS FOR PRESENTING CONTENT AND REPRESENTATIONS OF CONTENT ACCORDING TO DEVELOPMENTAL STAGE

BACKGROUND

Field

This U.S. patent application relates generally to presenting age-appropriate content in a user interface.

Description of Related Art

Online content providers have large libraries containing hundreds, if not thousands, of items of content available to content consumers. For special populations, such as children, some of this content can be inappropriate and is typically blocked from members of those populations. Even regarding the content that is not blocked, some of the allowed content can be inappropriate for certain members of the population. For instance, among children, content targeted to adolescents is inappropriate for toddlers. Further, adolescents may react unfavorably to being shown content targeting toddlers.

It is generally accepted that children develop according to a known sequence of stages. However, individual children advance through these stages at different rates. Some children may advance so quickly that they appear to skip certain stages while others may appear to be stuck in a particular stage for a longer than normal period of time. Thus, two children at the same chronological age can be at very different stages of development. Further, the same child may be at one developmental stage in one area of development (e.g., communication skills) but at another stage in another area of development (e.g., fine motor control). Herein, the term, "developmental stage" refers to the current developmental stage(s) of the child. The developmental stage does not necessarily correspond to the chronological age of the child.

Content is targeted to children according to chronological age. However, it is well known that children consume content targeted outside of their chronological age. Further, as discussed above, the chronological age of the child does not necessarily reflect the developmental stage of the child.

SUMMARY

According to some embodiments, a method comprises determining a developmental stage of a user, the developmental stage being a contiguous range of discrete ages, obtaining a viewing history of the user, the viewing history identifying content previously displayed to the user, obtaining an operating context of the user, selecting multiple instances of tagged content based on the developmental stage, the viewing history, and the operating context, and generating a display of the selected content items based on the developmental stage by selecting representations of at least some of the selected content items pre-determined to be appropriate for the developmental stage, and generating surrounding layout elements pre-determined to be appropriate for the developmental stage.

The method can further include, according to one or more embodiments, at least one of the following in various combinations: wherein determining the developmental stage of the user further comprises receiving an indication of the developmental stage of the user via a functional element included in the display provided to the client device; wherein the functional element defines a range of developmental stages and wherein the functional element further comprises an adjustable range limit element setting a limit, within the range, of the indication of the developmental stage of the user; wherein the functional element defines a range of developmental stages and wherein the method further comprises advancing the range of developmental stages to include an advanced developmental stage by: selecting additional instances of tagged content based on the advanced developmental stage, generating representations of at least some of the selected additional content, generating a prompt for a guardian to advance the range of developmental stages to include the advanced developmental stage, the representations of the selected additional content included in the prompt, and providing the prompt to the client device; wherein determining the developmental stage of the user is based on the viewing history of the user; wherein the operating context comprises at least one of a time of day, geographical location, and an identifier of the client device when content is consumed; wherein the representations of at least some of the selected content have a color, a level of detail, a shape or a size pre-determined to be appropriate for the developmental stage; wherein the representations of at least some of the selected content have text pre-determined to be appropriate for the developmental stage; wherein the surrounding layout elements include graphics or functional elements pre-determined to be appropriate for the developmental stage, the functional elements can comprise a text search box, the functional elements can comprise a character bar having a plurality of character representations pre-determined to be appropriate for the developmental stage; wherein generating the display of the selected content comprises positioning the representations of at least some of the selected content based on the developmental stage; further comprising: tagging content with one or more metadata tags indicating a target consumer age and a relevance of the content to the target consumer age, resulting in the tagged content; and/or further comprising: providing the display to a client device.

According to some embodiments, a system comprises a developmental stage determination module configured to determine a developmental stage of a user, the developmental stage being a contiguous range of discrete ages, and obtain a viewing history of the user, the viewing history identifying content previously displayed to the user, a content selection module configured to obtain an operating context of the user, and select multiple instances of tagged content based on the developmental stage, the viewing history, and the operating context, a content representation selection module configured to select representations of at least some of the selected content pre-determined to be appropriate for the developmental stage, and a layout module configured to generate surrounding layout elements pre-determined to be appropriate for the developmental stage, and generate a display of the selected content including the representations and the surrounding layout elements.

The system can further include, according to one or more embodiments, at least one of the following in various combinations: wherein the developmental stage determination module is configured to generate a functional element included in the display provided to the client device, the functional element including depictions of two or more developmental stages and an option to set the determined developmental stage, the developmental stage determination module can be further configured to generate an adjustable range limit element on the functional element to set a limit on a range of developmental stages; wherein the developmental stage determination module is configured to determine the developmental stage of the user based on the viewing history of the user; further comprising a character bar module configured to generate a character bar having a plurality of character representations pre-determined to be appropriate for the developmental stage; further comprising a stage advancement module configured to: select additional instances of tagged content based on an advanced developmental stage, generate representations of at least some of the selected additional content, and generate a prompt for a guardian to advance a pre-defined range of developmental stages of the user to include the advanced developmental stage, the representations of the selected additional content included in the prompt; and/or further comprising a tagging module configured to tag content with one or more metadata tags indicating a target consumer age and a relevance of the content to the target consumer age.

According to some embodiments, a non-transitory computer-readable medium has instructions embodied thereon, the instructions are executable by one or more processors to perform operations comprising determining a developmental stage of a user, the developmental stage being a contiguous range of discrete ages, obtaining a viewing history of the user, the viewing history identifying content previously displayed to the user, obtaining an operating context of the user, selecting multiple instances of tagged content based on the developmental stage, the viewing history, and the operating context, and generating a display of the selected content based on the developmental stage by selecting representations of at least some of the selected content pre-determined to be appropriate for the developmental stage, and generating surrounding layout elements pre-determined to be appropriate for the developmental stage.

DETAILED DESCRIPTION

Systems and methods of selecting and presenting content, and more particularly representations of content, to child users based on developmental stage are described. To determine a developmental stage of a child, the system provides an input element that allows a parent or child user to select the child's developmental stage as a point in, or a portion of, a continuous range of childhood stages. In some instances, the developmental stage of the child may be determined based on viewing history or an operating context of the user. Content is selected for the user based on the developmental stage of the user. The user is then presented with representations of the content. The representations can then be selected in order to view or receive the content.

More particularly, a display is generated that is tailored to the developmental stage of the user. The generated display includes representations of the content pre-determined to be appropriate for the developmental stage of the user. Further, other display elements, such as background graphics, positions and style of the graphics, and the inclusion or exclusion of interface elements predetermined to be appropriate for the developmental stage are generated. As such, the generated display is tailored to the developmental stage of the user, including which content is selected, how the selected content is represented in the display, and the look and feel of the display itself. By interacting with the display, the user can select content to consume.

Figure 1:
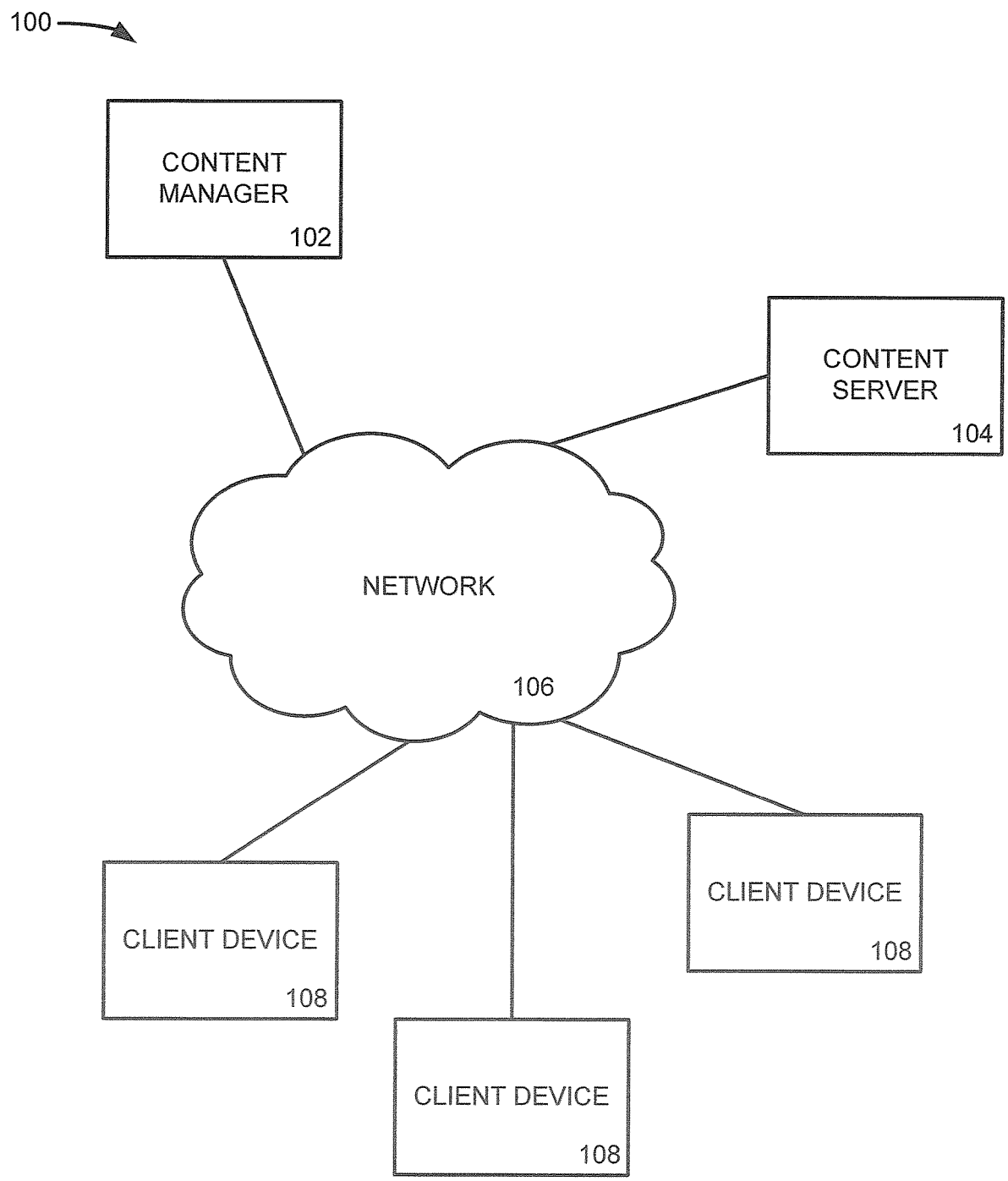
FIG. 1 is an example environment in which various embodiments can be implemented.

Referring now to FIG. 1, an example environment 100 is shown in which various embodiments can be implemented. The environment 100 comprises a content manager 102 and a content server 104 that are configured to communicate over a network 106 with one or more client devices 108.

The content manager 102 identifies content that can be made available to the client devices 108 and presents the content in a generated display. The content manager 102 selects content based on a number of factors including developmental stage of the user. The content manager 102 can maintain a user profile that includes information about the user, such as demographic information or information about the client devices 108 used by the user. The content manager 102 can further maintain a viewing history that identifies content that has already been consumed by the user.

The content server 104 stores or otherwise accesses items of content selected by the user for viewing on the client device 108. The content can be television shows, movies, music, games, images, audio programs, or other types of digital content. In response to the user selection, the content server 104 delivers the content to the client device 108.

In some instances, the content manager 102 and the content server 104 are co-operated and/or co-managed by a same entity. In some embodiments, the functionalities of the content manager 102 and the content server 104 are co-located and/or combined.

The client device 108 can be used by a single user or by more than one user to choose content for consumption. The client device 108 can be any of a number of consumer devices such as, but not limited to, a smartphone, a tablet, a netbook, a laptop computer, a desktop computer, a gaming console, a set-top box, a television or some combination of these devices. In some instances, a user may habitually use more than one of the client devices 108.

Figure 2:
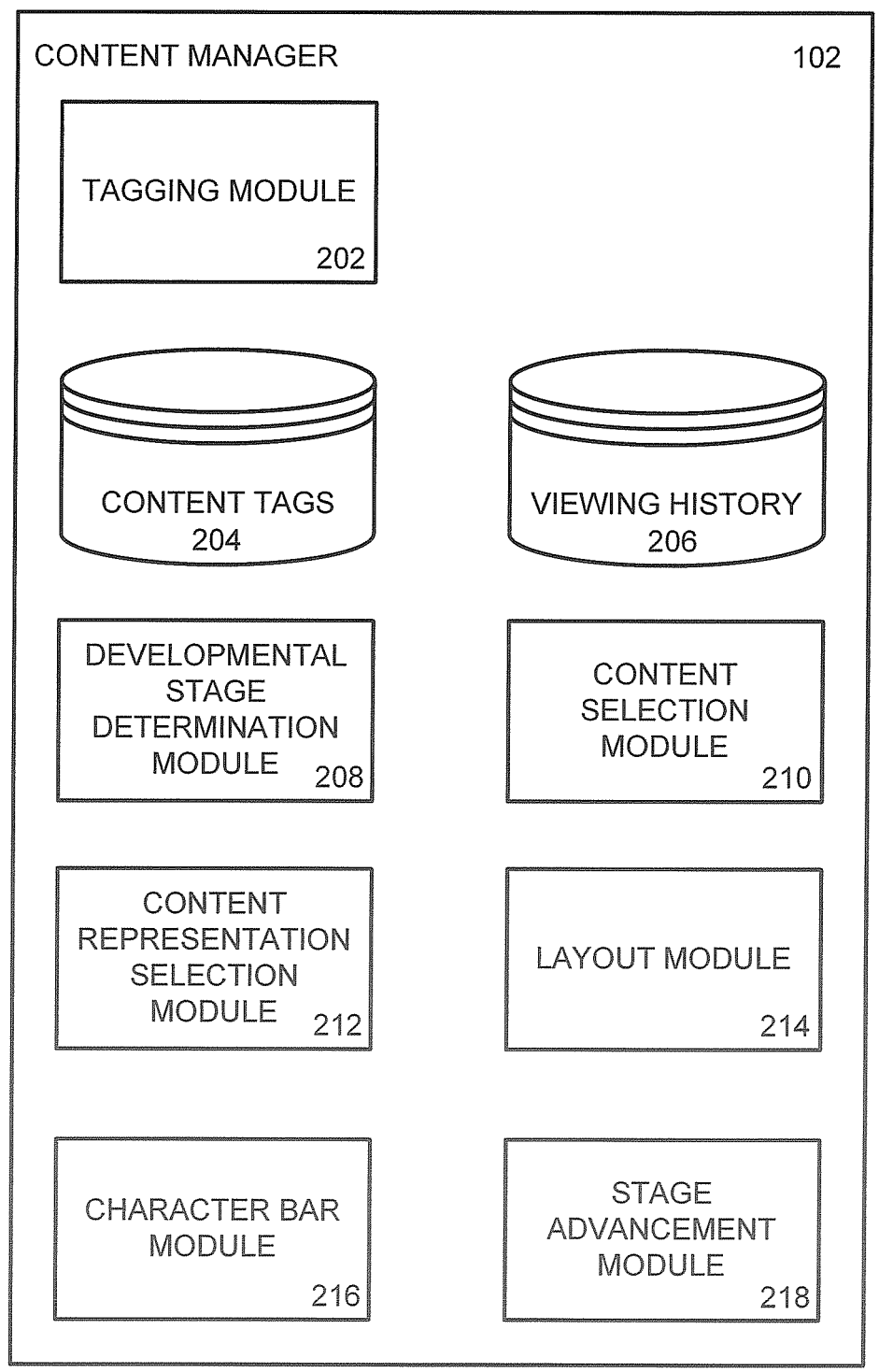
FIG. 2 is a block diagram of a content manager system, according to some embodiments.

Referring now to FIG. 2, a block diagram is shown of the content manager 102, according to some embodiments. The content manager 102 comprises a tagging module 202, a content tags database 204, a viewing history database 206, a developmental stage determination module 208, a content selection module 210, a content representation selection module 212, a layout module 214, a character bar module 216, and a stage advancement module 218. The content manager 102 can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the network 106) or other form of communication. The content manager 102 comprises one or more modules embodied in computing logic or executable code such as software.

The tagging module 202 is configured to tag content with metadata tags. Each item of content can have more than one metadata tag. Each metadata tag includes a target consumer age that indicates the chronological age of children who typically consume that content or to whom the content is targeted. Along with the chronological age, in some embodiments the tag includes a relevance of the chronological age to the content. The relevance indicates the likelihood that children of that chronological age, or range of chronological ages, are likely to select and consume the content. The relevance is quantitative. Examples of relevance include, but are not limited to, a numerical weighting factor, a percentage, or other calculated or pre-determined value.

The metadata tag can be generated by the tagging module 202 based on, for example, information received from the content server 104 or a third party source. The information can include a description of the content provided by a content producer. In other instances, the metadata tag can be generated based on viewing histories of users having a known developmental stage or chronological age. For example, one item of content can include three metadata tags: "ages 6-7, relevance 50%"; ages 8-9, relevance 90%"; and "ages 10-11, relevance 50%". This item of content is most relevant to children of chronological ages 8-9 but can be enjoyed by children who are aged 6-7 or 10-11 as well.

In some instances, the metadata tags, or a portion of the metadata tags, can be provided by a third party. The third party can provide, for example, the target chronological age assigned to the content by a content producer. The tagging module 202 can modify the provided tags (e.g., add a relevance to a provided tag that includes a chronological age) and/or add additional metadata tags to the content.

The metadata tags along with identifiers of the content are stored in the content tag database 204. The content tag database 204 can be accessed by the tagging module 202 to retrieve and update tags or to store newly generated tags. As described herein, the other modules within the content manager 102 can access metadata tags in the content tag database 204.

A viewing history database 206 stores a record of content previously consumed by the user. The viewing history database 206 can include additional information such as a user identifier, a time and/or date indicating when the content was consumed, and an operating context of the user at the time the content was consumed. The operating context can include, for example, the time of day the content was consumed, a geographic location of the client device 108 when the content was consumed, or an identification or description of the client device 108 used to consume the content.

The developmental stage determination module 208 is configured to determine the developmental stage of the user. As discussed above, the developmental stage of the user is separate from the chronological age in that children can develop at different rates so that two children of the exact same chronological age can often be at different developmental stages.

Figure 5:
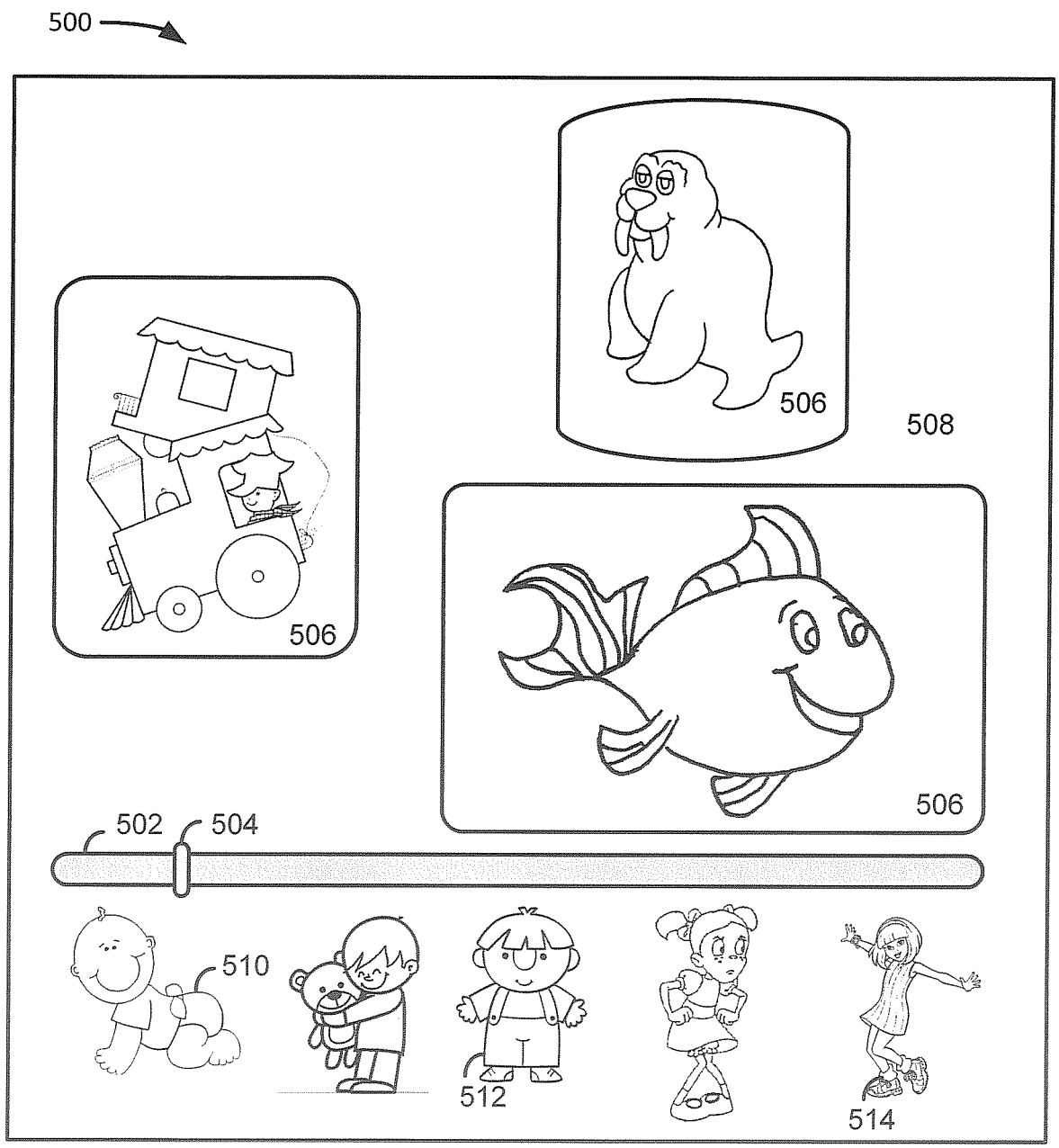
FIG. 5 is a portion of a generated display presenting representations of content to a child user at a first developmental stage.
Figure 6:
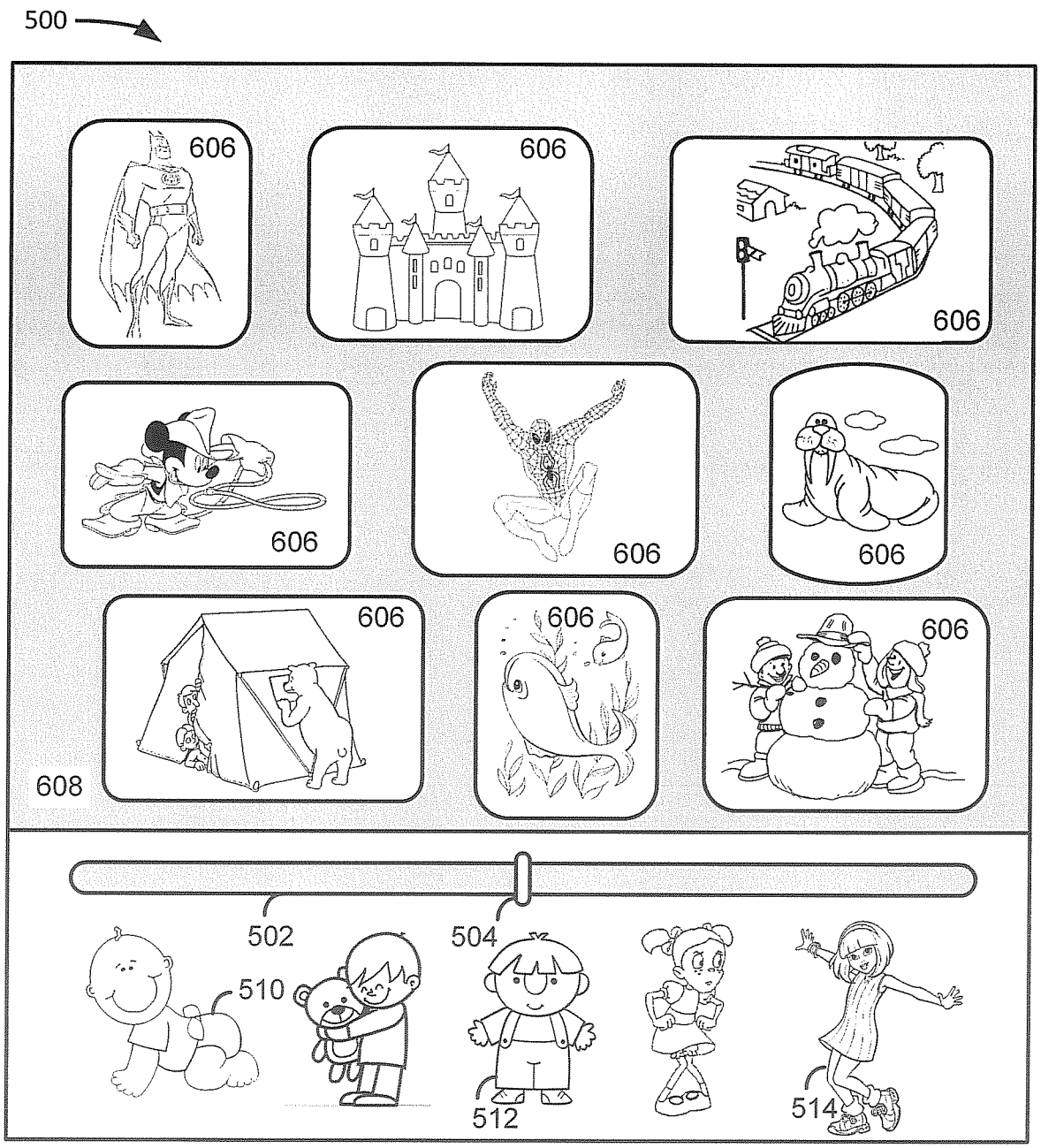
FIG. 6 is portion of the generated display presenting representations of content to a child user at a second developmental stage.
Figure 7:
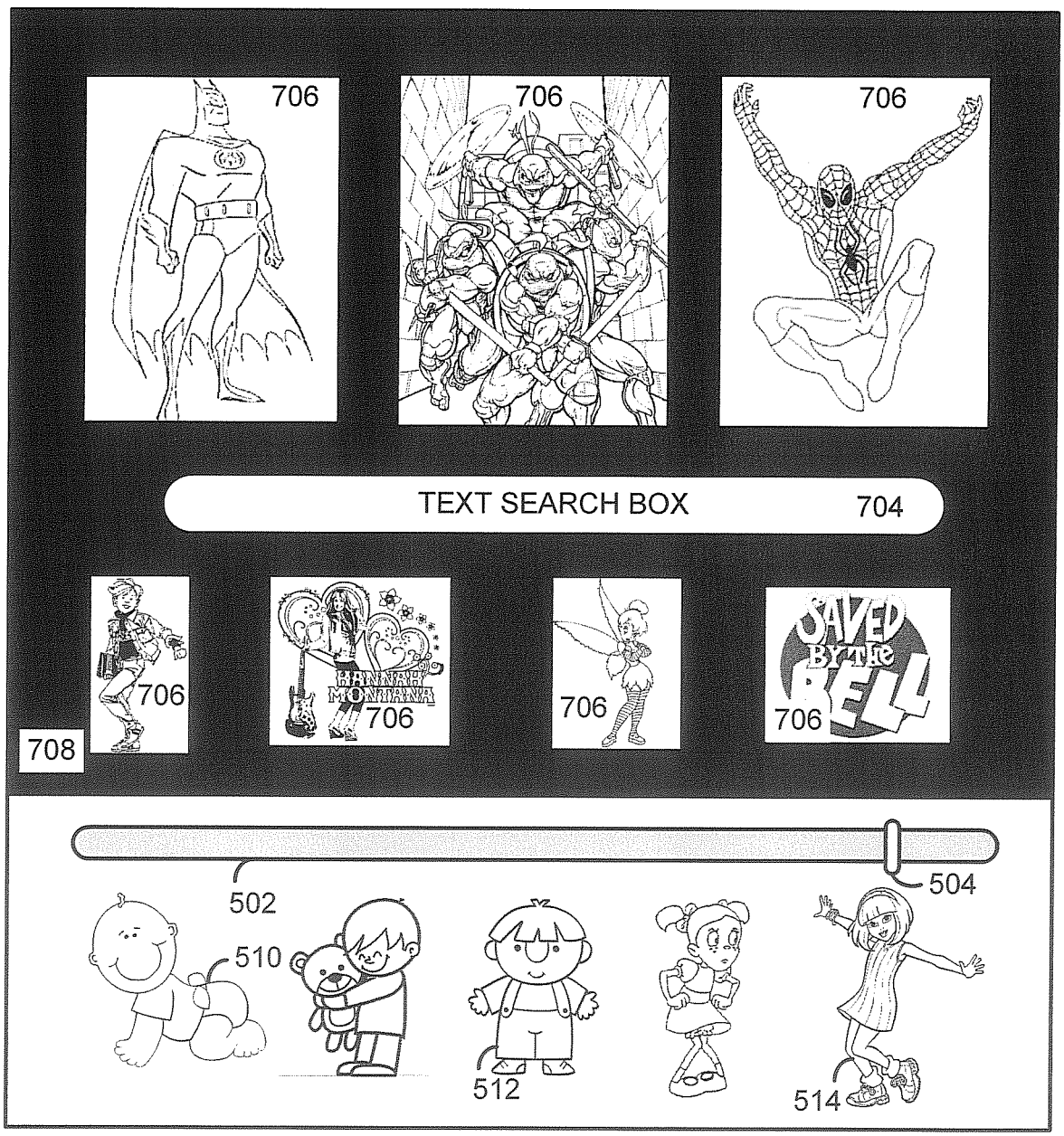
FIG. 7 is a portion of the generated display presenting representations of content to a child user at a third developmental stage.

FIGS. 5-7 depict portions of a generated display (e.g., a graphical user interface or "GUI") presenting representations of content to a child user at a first, second, and third developmental stage, respectively. The developmental stage determination module 208 can determine the developmental stage of the user via input from an interface element, such as a position of a slider 504 on a slider bar 502 depicted in FIGS. 5-7. Other examples of interface elements include, but are not limited to, a stage selector dial, a stage selector tab that opens like a drawer with a tap, selectable tabs or buttons, a pop-up menu, and a pull-down menu.

The interface element defines a range of developmental stages, including a predefined minimum and maximum developmental stage. The interface element allows the user to adjust the input, within the defined range, corresponding to the developmental stage of the user. The interface element can allow for continuous (or substantially continuous) selection or offer a pre-determined, limited number of discrete stage choices.

As the input changes, the generated display 500 can morph on the fly to display different representations of content that correspond to the input determined developmental stage. In other embodiments, the generated display 500 is updated upon the user refreshing the generated display after selecting a stage. The user, based on the representations and the generated display, can provide his closest approximate developmental stage.

For example, referring now to FIG. 5, when the slider 504 is in a first position along slider bar 502, indicating that the user has a developmental stage corresponding to an infant by virtue of being proximate to a depiction of an infant 510, the generated display 500 is tailored to a younger audience as discussed in greater detail below.

Furthering the example, referring now to FIG. 6, the slider 504 in the generated display 500 is moved to a second position along the slider bar 502, indicating that the user has a developmental stage corresponding to a toddler by virtue of being positioned proximate to a depiction of a toddler 512. As shown in the figure, the generated display 500 has changed to reflect the developmental stage indicated by the position of the slider 504 along the slider bar 502.

Furthering the example even more, referring now to FIG. 7 the slider 504 is in a further position along slider bar 502 thus indicating that the user is of an adolescent developmental stage by virtue of being proximate to a depiction of an adolescent 514. Again, the generated display 500 is tailored to the selected developmental stage.

It is to be understood that the slider 504 is not limited to the three positions shown along slider bar 502 in the figures. The user can position the slider 504 at any, or nearly any, position along a continuum defined by the slider bar 502. The generated display 500 is modified at each developmental stage so that the generated display 500 changes as the slider 504 is moved by the user.

In some instances, the developmental stage determination module 208 can determine a developmental stage based on the viewing history of the user. To determine the developmental stage from the viewing history, the developmental stage determination module 208 can access the viewing history of the user from the viewing history database 206 to identify the content previously consumed by the user. Based on the identified content, the developmental stage determination module 208 can then access the metadata tags of the identified content from the content tag database 204. From the chronological age and relevance included in the content tags, the developmental stage determination module 208 can determine an approximate developmental stage of the user.

Referring again to FIG. 2, the content selection module 210 is configured to select content to present as representations to the user in, for example, the generated display 500, based on the determined developmental stage of the user. To select the content, the content selection module 210 accesses the metadata tags stored in the content tag database 204. The chronological ages included in the metadata tags are compared to the developmental stage of the user. Items of Content are selected based on the relevance included in the tag. In some instances, the same item of content can be selected for more than one developmental stage.

In some embodiments the content selection module 210 can additionally base selection of the content on the viewing history of the user and/or an operating context of the user or client device 108. The viewing history of the user can, for example, be used to prevent selection of content that has been previously consumed by the user.

In some embodiments the content selection module 210 can determine or obtain the operating context. One example of determining operating context is useful in distinguishing between two users who share a client device 108 or account to access content. When a device or account is shared between two users, such as between two siblings, determining what type of content is typically viewed at different times of day can be used to later distinguish between the two siblings using the client device 108 or account. For example, a device or account shared between siblings can be habitually accessed by one sibling in the morning (e.g., before school) and by the other sibling in the afternoon (e.g., after school). This viewing history can be used to distinguish between the two sibling users. For example, based on that viewing history and a current time of day included in the operating context, the content selection module 210 can select content appropriate to each user despite the fact that both may use the same client device 108 and even a same account to access content.

The content representation selection module 212 is configured to select representations of the selected content from a library of pre-generated representations based on the developmental stage. In an embodiment the representations are stored in the content manager 102 (as were content tags in content tags database 204 and viewing history in viewing history database 206). The representations form part of the generated display 500 of, for example, FIGS. 5, 6, and 7. The representations are targeted to a particular developmental stage or range of developmental stages. The representations each include colors and/or a level of detail that are pre-determined to be appropriate for a particular developmental stage. Further aspects of the representations, such as the presence of text, the size of the representation, or the shape of the representation, are tailored to different possible developmental stages.

For example, referring again to FIG. 5, depicted content representations 506 are tailored to appeal to a user having the developmental stage of a toddler because the slider 504 is positioned along the slider bar 502 adjacent to the depiction of the infant 510. In this example, the content representations 506 have a relatively low level of detail that is pre-determined to be appropriate for this developmental stage. While not depicted, the representations 506 can be in color rather than black-and-white. The colors for the representations 506 at this developmental stage can be primary, bright, and cheery. Further, the representations 506 are large and widely spaced so that they can be easily selected by a user who has not yet developed fine motor skills.

As another example, referring again to FIG. 6, depicted content representations 606 are tailored to appeal to a user having the developmental stage of an early elementary-aged child because the slider 504 is positioned along the slider bar 502 adjacent to the depiction of the toddler 512. The content representations 606 have a higher level of detail than those depicted in FIG. 5. While not depicted, the content representations 606 can include colors that are predetermined to be appropriate for children of the developmental stage, such as complex, bold, saturated colors. It is to be understood that at least some of the content representations 606 shown in FIG. 6 can represent the same content as did the content representations 506 of FIG. 5. However, the content representations 606 have a greater level of detail and/or are colored using a more complex color palette that is more suitable to the later developmental stage. Moreover, the representations themselves are smaller than those shown in FIG. 5 as a child of a later developmental stage is likely to have improved fine motor skills needed to view and to select a smaller representation in order to consume the content.

As a further example, referring again to FIG. 7, depicted content representations 706 are tailored to appeal to a user having the developmental stage of an adolescent because the slider 504 is positioned along the slider bar 502 adjacent to the depiction of the adolescent 514. The content representations 706 have a still higher level of detail than those depicted in both FIGS. 5 and 6, reflecting this still later developmental stage. Colors used in the generated display 500 for this developmental stage may be darker and more sophisticated than those of the younger developmental stages. Further, some or all of the content representations 706 are smaller than the representations 506, 606 in FIGS. 5 and 6 because children of this developmental stage have more greater fine motor and cognitive skills. Some of the content representations 706 can include text as children of this developmental stage typically have a higher level of reading and cognitive skills.

Referring again to FIG. 2, a layout module 214 is configured to generate a presentation of the selected representations of the selected content as part of the generated display 500. The layout module 214 generates the surrounding elements of the generated display 500 such as background graphics and other icons. Other icons can include, for example, a logo identifying the owner/operator of the content manager 102. The layout module 214 can further determine relative positions and sizes of the content representations. To determine a size of the content representations, which can also be determined by the content representation selection module 212, the layout module 214 can scale the content representations according to one or more pre-determined rules that dictate the size of the content representations based on the operating context (e.g., type of client device 108) and/or the developmental stage of the user.

For example, referring again to FIGS. 5, 6, and 7, the generated display 500 includes the content representations 506, 606, 706. The layout module 214 generates the generated display 500 based on the developmental stage indicated by the position of the slider 504 as follows. A background 508 of FIG. 5 is depicted as being solid white. Further, the layout module 214 can position the content representations closer or further apart based on the developmental stage of the user. The content representations 506, depicted in FIG. 5, are positioned in a more haphazard manner, rather than in rows and columns, about the generated display 500 to appeal to a toddler. Further the corners of the content representations 506 can be rounded by the layout module 214 to appear softer for these users.

As depicted in FIG. 6, because the user's developmental stage is greater, the background 508 is darkened from white to gray. The content representations 606 are positioned closer together than the content representations 506. The corners of the content representations 606 are still rounded, like those shown in FIG. 5. Unlike FIG. 5, the content representations 606 are at least roughly positioned in rows and more content representations 606 are included in the generated display 500.

As depicted in FIG. 7, because the developmental stage is still greater, the background 508 is darkened from gray to black. The content representations 706 are positioned closer together than the content representations 606. The corners of the content representations 706 are no longer rounded but are now straight corners. Unlike FIG. 5, the content representations 706 are positioned in rows.

The layout module 214 can further determine whether to include certain functional elements in the generated display. Functional elements can include a developmental stage selection element (e.g., the slider 504), a text-based search box, a character bar containing character representations (as described below), and warnings or advisories. As illustrated in FIG. 7, for an early teen user, the generated display 500 can include a text search box 704. Additionally, the content representations 706 are presented according to a more sophisticated layout, with some content representations 706 more prominently displayed by being larger and located at the top of the generated display 500 above the text search box 704 and other content representations 706 less prominently displayed by being smaller and located below the text search box 704. The relative prominence can be determined based on the viewing history or operating context of the user.

Referring again to FIG. 2, the character bar module 216 is configured to generate the character bar. The character bar is a functional element that can be included in the generated display in some embodiments. The character bar comprises a representations of popular characters (rather than representations of content) that are pre-determined to be appropriate for the developmental stage of the child user. When a displayed character representation is selected by the user, new content for that user's developmental stage is selected by the content selection module 210 that feature the selected character or that have characters that are related to the selected character. The content representation selection module 212 then selects representations of the newly selected content for inclusion in the generated display.

Figure 8:
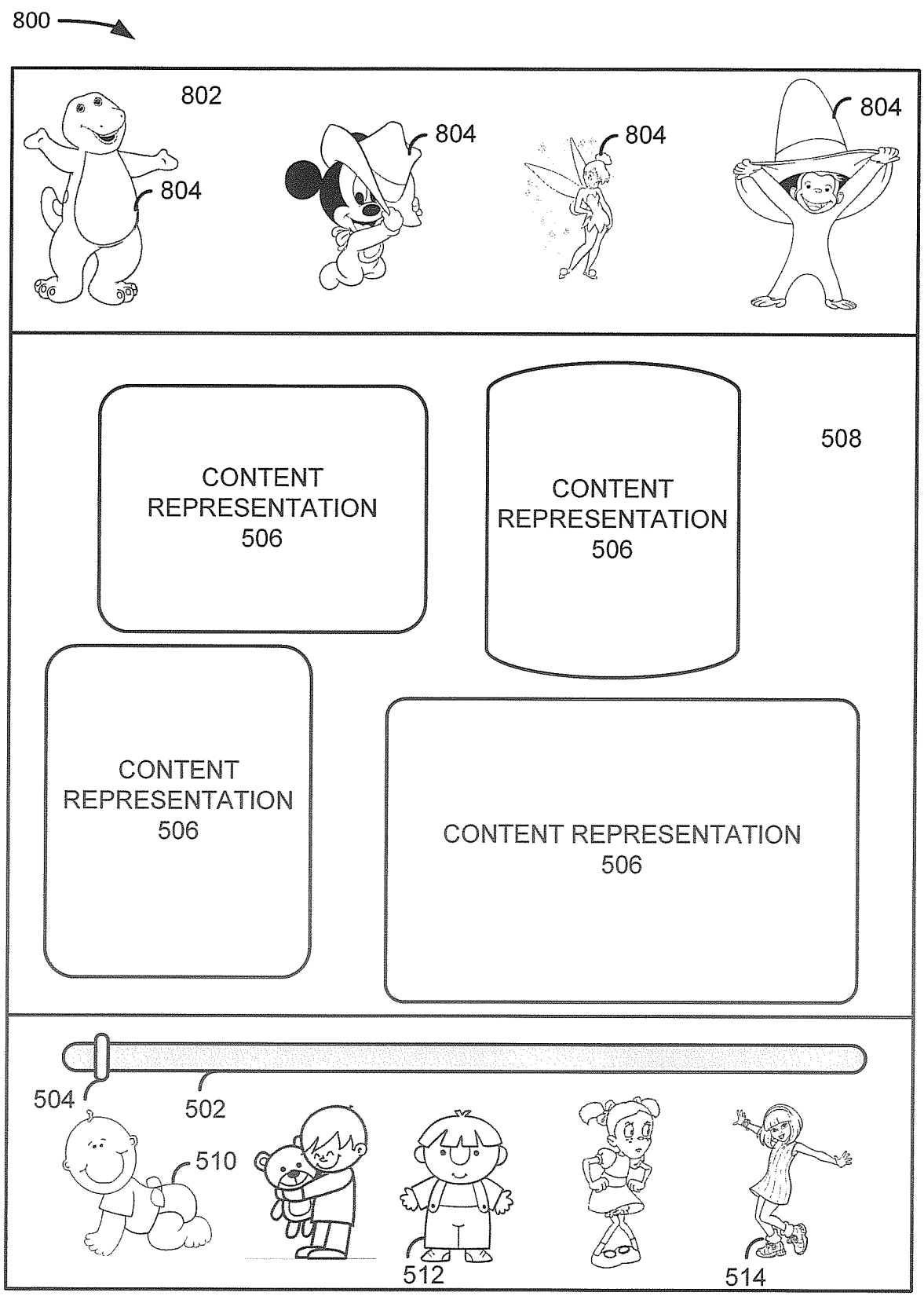
FIG. 8 is a further portion of the generated display presenting representations of content to the child user at the first developmental stage.
Figure 9:
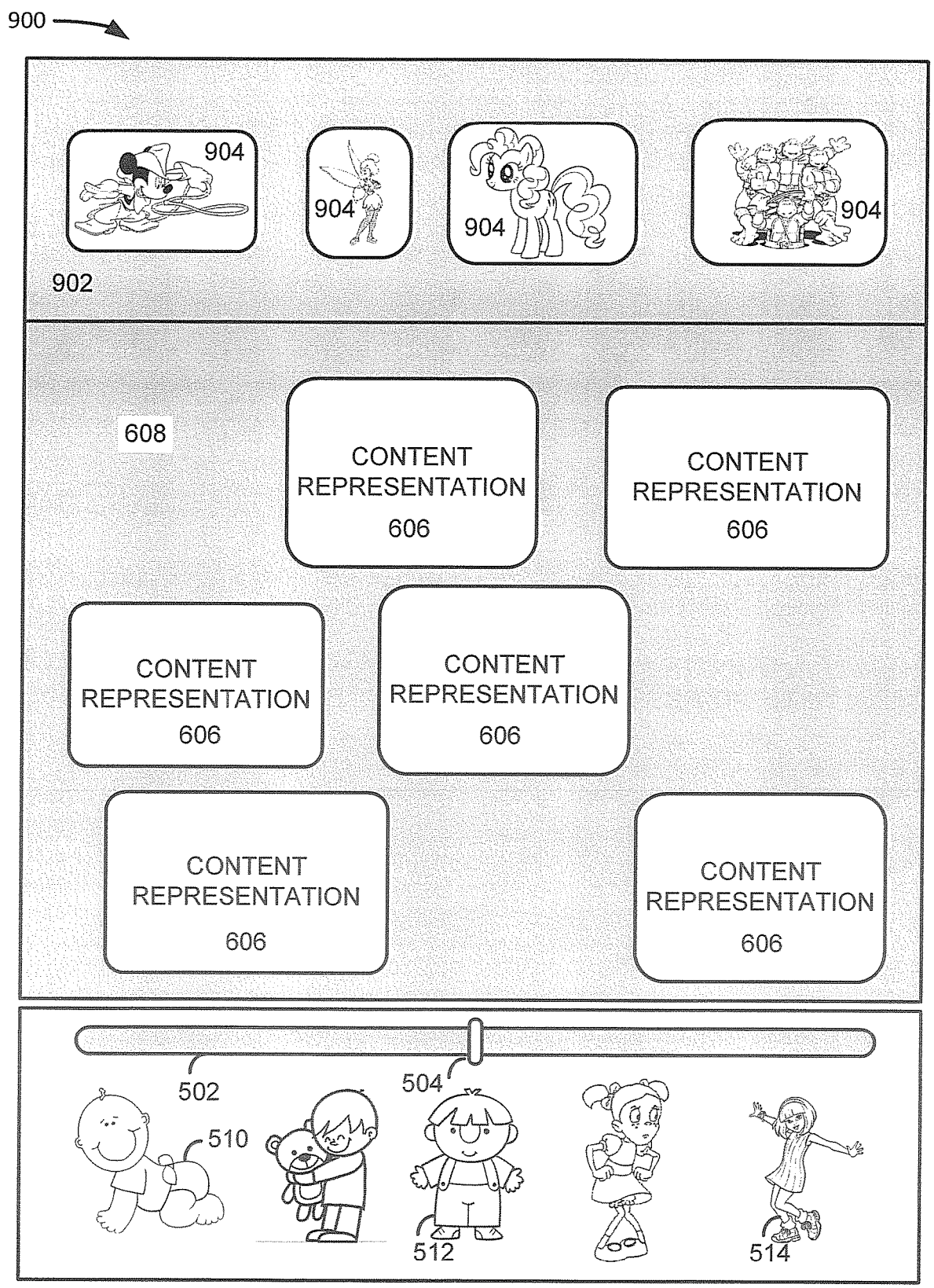
FIG. 9 is a further portion of the generated display presenting representations of content to the child user at the second developmental stage.

FIGS. 8 and 9 depict a generated display 800, 900 including a character bar 802, 902 for a user at the developmental stages of infant 510 and toddler 512, respectively. The generated display 800 depicts the addition of the character bar 802 to the generated display 500. The character bar 802 is generated from characters in the content selected based on the developmental stage as described elsewhere herein. Like the representations of the items of content, the representations of the characters are tailored to the developmental stage of the user.

Referring now to FIG. 8, the character bar 802 includes representations of popular characters 804 in content selected for an infant 510, as indicated by the position of the slider 504. The character representations 804, like the content representations 506, have a level of detail and/or colors that are pre-determined to be appropriate for the developmental stage of the user. The user can select a character representation 804 by touching it via a touchscreen using a finger or stylus, using a voice command identifying the character represented by the character representation 804, or by selecting the character representation 804 using a mouse, keyboard, or other known input mechanism. When a character representation 804 within the character bar 802 is selected by the user, content featuring the selected character is selected by the content selection module 210. The content representation selection module 212 selects content representations 506 of the newly selected content that feature the character or are otherwise related to the selected character (e.g., from the same content producer, from a same set, collection, or series of content, etc.).

Referring now to FIG. 9, the character bar 902 includes character representations 904 of popular characters in content selected for the later developmental stage of the user indicated by the position of the slider 504. The character representations 904 within the character bar 902 can include some of the same characters as the character bar 802 but are depicted at a higher level of detail more appropriate to the later developmental stage. In this example, some character representations 904 have been removed and other character representations 904 have been added, resulting in the character bar 902. As depicted and based on the developmental stage of the user, the character representations 904 are also different than the character representations 804 in that the character representations 904 have a defined boundary. As was described in connection with FIG. 8, the content representations 606 are generated based on the developmental stage of the user and any selections of a character representation 904 from the character bar 902.

In another embodiment, someone responsible for a child user may wish to exercise some control over the content displayed to the child user as well as the content representations shown in the generated displays described herein. Such a person, referred to herein as a "guardian", can include a parent of the child user or someone who has responsibility for the child user such as a grandparent, legal guardian, teacher, nanny, babysitter, camp counselor, daycare provider, etc. In such an embodiment, the guardian may first be required to authenticate themselves to the system in some fashion known in the art, such as by user name and password, to evidence their authority for exercising such control.

Figure 10:
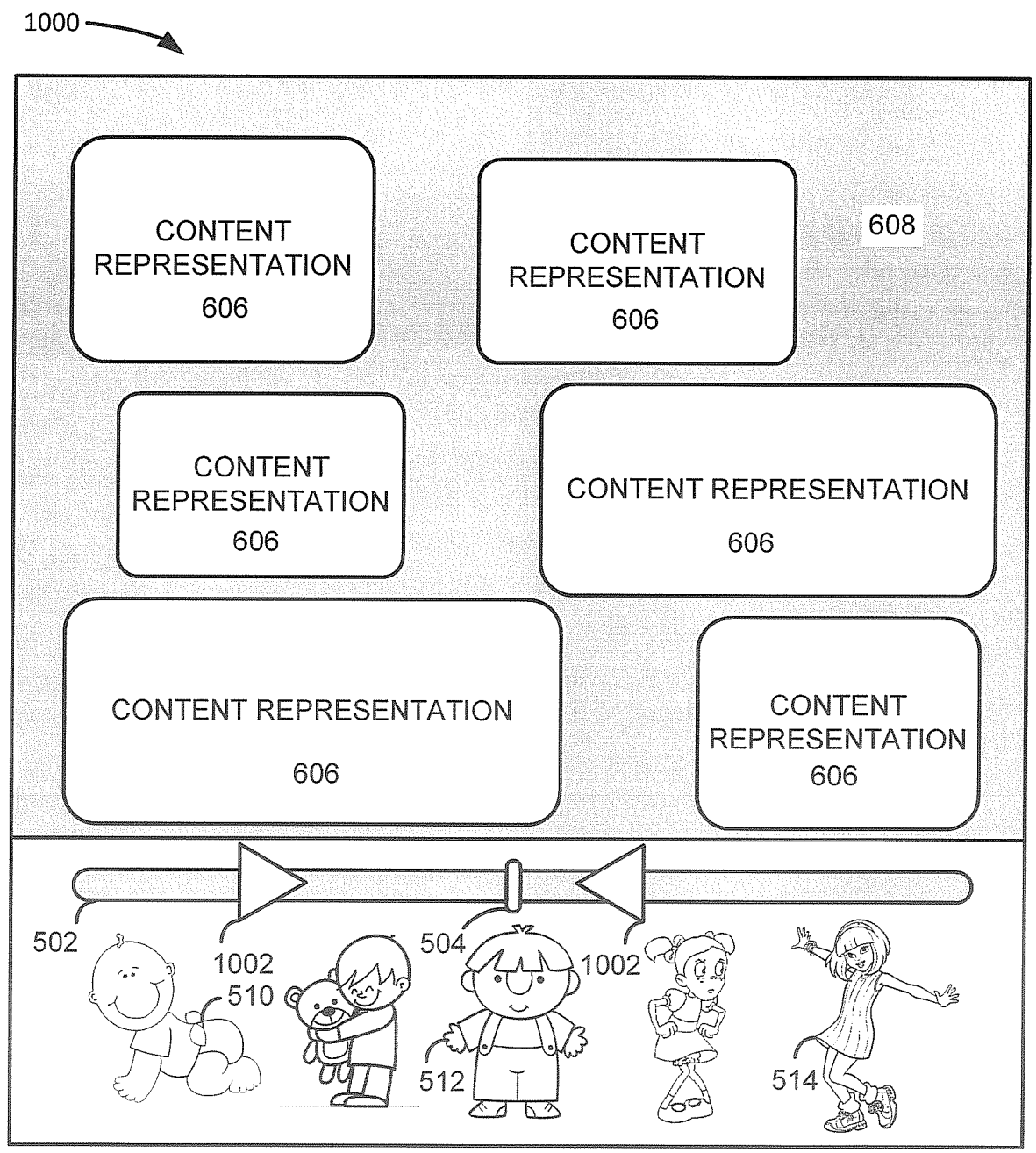
FIG. 10 is a portion of a generated display for setting an allowable range of developmental stages over a first range of developmental stages.

In one embodiment for a guardian to exercise such control, the generated display includes one or more functional elements for setting an allowable range of developmental stages accessible to the child user. For example, referring now to FIG. 10, interface 1000, which includes the slider bar 502, the slider 504, also includes one or more adjustable range limit elements 1002 that can be moved by the guardian using known user interface techniques (e.g., by "clicking and dragging" or "touching and dragging") to set upper and/or lower limits within the broader range of possible developmental stages defined and depicted by slider bar 502. Once these range limit elements 1002 are set by the guardian, the child user's ability to move the slider 504 along the slider bar 502 is limited or constrained to being within the more limited range of possible developmental stages (i.e., between the lower and upper range limit elements 1002). In this example, the child user's ability to indicate their developmental stage has been reduced from being anywhere along the entirety of the slider bar 502, to instead be limited to being between the lower and upper range limits 1002 shown. Referring again to FIG. 2, it is to be understood that the content manager 102 can be configured to provide this range limiting function and, in particular, may do so via the developmental stage determination module 208 or the stage advancement module 218.

In another embodiment for a guardian to exercise such control, a child user may already have been exposed to or be developmentally capable of consuming content that is more advanced than the pre-set limit defined by an upper end of a display bar in a generated display. In such a case, the guardian may desire to allow the child user to indicate this greater developmental capability to thereby give the child user access to such more advanced content.

In this embodiment, the stage advancement module 218 is configured to help the guardian determine whether to allow the child user to be able to advance the developmental stage of the child user beyond the pre-set limit defined and depicted by the upper end of the slider bar 502. In this embodiment, the stage advancement module 218 causes the content selection module 210 to select content for an advanced developmental stage. The advanced developmental stage is some pre-determined increment above the current upper limit of the slider bar 502. The stage advancement module 218 then instructs the content representation selection module 212 to generate representations of the selected content for the advanced stage.

In some instances, the stage advancement module 218 is configured to generate a prompt for display to the authenticated guardian asking that the guardian allow the child to access content tagged to a higher developmental stage, beyond the range of the slider bar 502. In one example, such a prompt is provided when a child's viewing history indicates that the child is regularly consuming content near the upper end of the slider bar 502. The prompt can include the content representations of the more advanced content to thereby give the guardian a better understanding of what content the guardian is making accessible to the child. Receiving a positive response from the guardian causes the various modules of the content manager 102 to advances the pre-defined range of developmental stages thereby allowing the child user to indicate they are of a higher developmental stage and receive a generated display that includes content representations of content of the more advanced developmental stage which then allows the child user to select such more advanced content for consumption.

Figure 11:
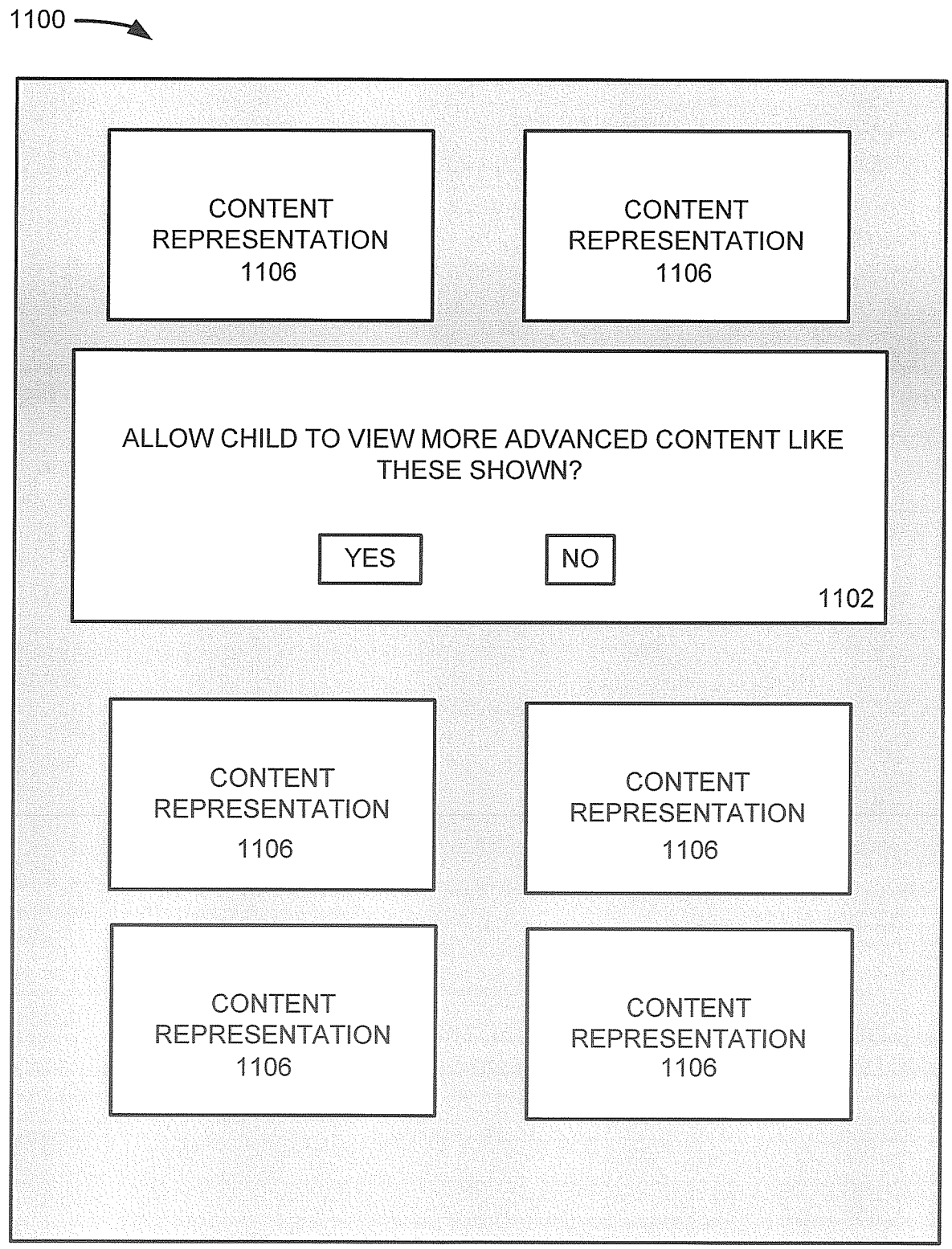
FIG. 11 is a portion of a generated display for advancing a defined range of developmental stages.

Referring now to FIG. 11 is an example of a generated display 1100 for a guardian to expand a range of developmental stages available or accessible to a child user. The prompt 1102 asks the guardian whether to allow the child to access content of a more advanced developmental stage. To aid the guardian, representations 1106 of content that the guardian is granting the child access to are included and shown in the generated display 1100. The content representations 1106 can be supplemented with additional information such as parental guidance or other known warnings about the content. In some instances, the content representations 1106 can be altered using one or more visual effects, such as depicting the content representations 1106 in grayscale or black and white instead of color or by depicting the content representations 1106 as greyed out. As has been explained, receiving a positive response from the guardian to the generated response advances the range of developmental stages beyond the pre-defined upper limit, etc.

Figure 3:
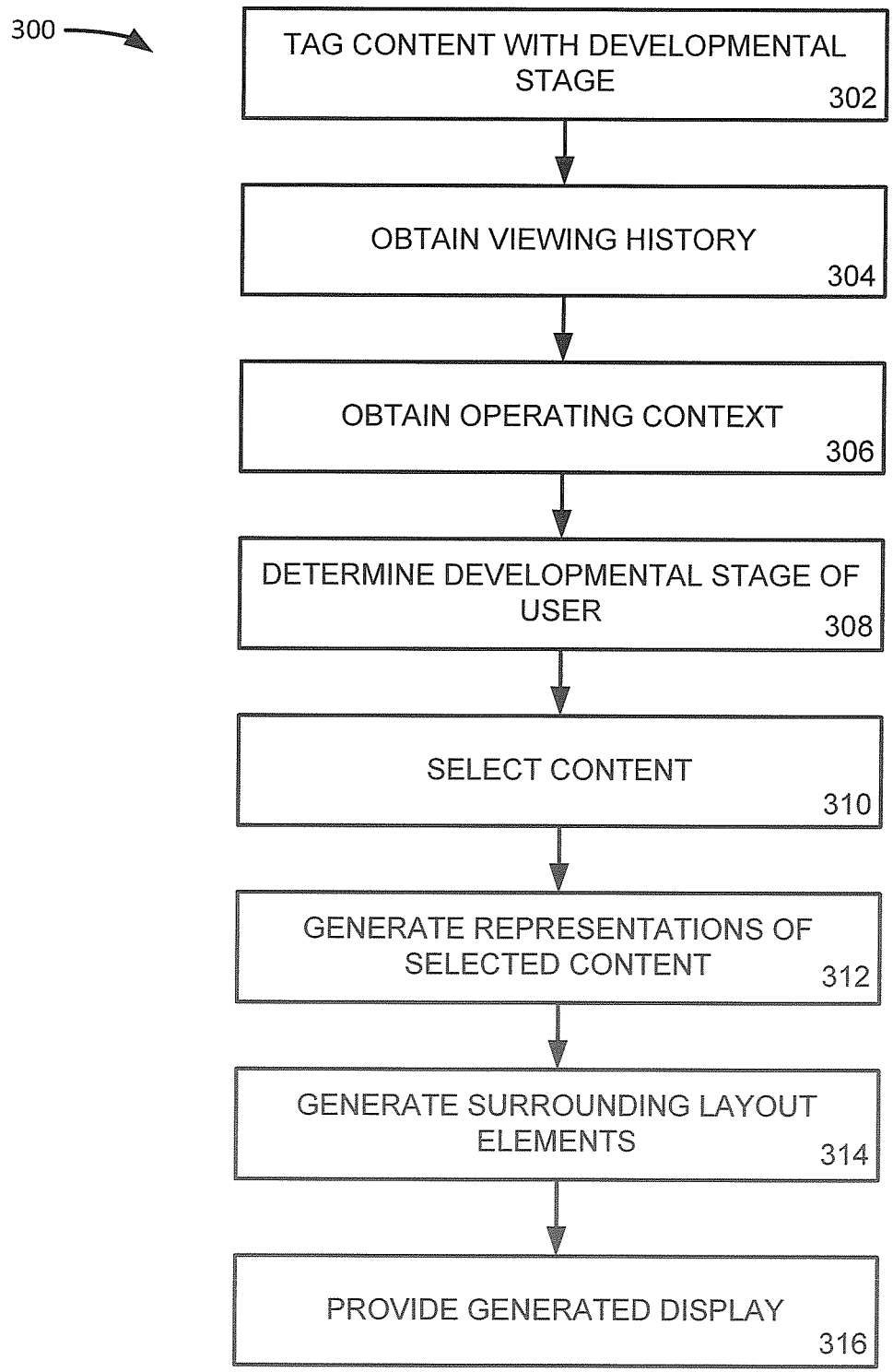
FIG. 3 is a flowchart of a method for presenting representations of content, according to some embodiments.

Referring now to FIG. 3 is a flowchart of a method 300 for presenting representations of content, according to some embodiments. The method 300 can be performed by the content manager 102. The operations of the method 300 can be performed in alternate sequences, as would be apparent to one skilled in the art.

In an operation 302, content is tagged with metadata tags indicating an age and, in some embodiments, a relevance of the age to the content. The operation 302 can be performed by the tagging module 202, as described above.

In an operation 304, the viewing history of the user is obtained by, for example, the developmental stage determination module 208 from the viewing history database 206, as described above.

In an operation 306, the operating context is obtained by, for example, the developmental stage determination module 208, as described above.

In the operation 308, the developmental stage of the user is determined. The developmental stage can be determined from the viewing history, the operating context, and/or based on a user input using an input mechanism or functional element. The developmental stage determination module 208 can determine the developmental stage of the user, as described above.

In an operation 310, content is selected based on the viewing history, the operating context, and/or the developmental stage of the user. The content selection module 210 can select the content, as described above.

In an operation 312, representations of the selected content are generated based on the developmental stage of the user. The representations can be generated by the content representation selection module 212, as described above.

In an operation 314, surrounding layout elements are generated based on the developmental stage of the user. The layout module 214 can generate the surrounding layout elements, as described above.

In an operation 316, the representations of the selected content and the surrounding layout elements are used to provide a generated display (e.g., GUI) to the client device 108 by, for example, the layout module 314, as described above. When a user selects a content representation within the generated display, the content represented by the select content representation is provided for consumption by the user.

Figure 4:
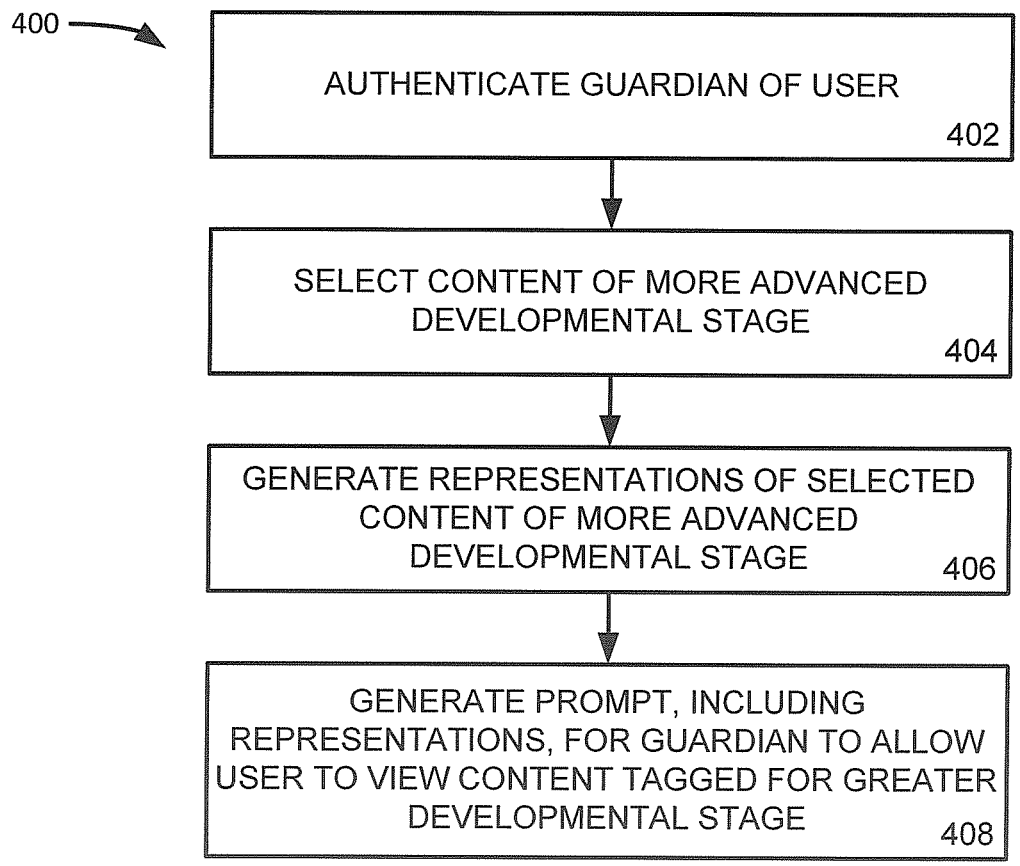
FIG. 4 is a flowchart of a method for advancing a defined range of developmental stages, according to some embodiments.

Referring now to FIG. 4 is a flowchart of a method 400 for expanding a pre-defined range of a developmental stage of a user, according to some embodiments. The method 400 may be performed by the stage advancement module 218, as described above.

In an operation 402, the guardian of the user is authenticated. The guardian is authenticated using authentication processes known to those skilled in the art including, but not limited to, logging into the user account using a username and password.

In an operation 404, content of a more advanced developmental stage are selected. The stage advancement module 218 can instruct the content selection module 210 to select the content corresponding to the more advanced developmental stage.

In an operation 406, representations of selected content of the more advanced developmental stage are generated. The stage advancement module 218 can instruct the content representation selection module 212 to generate the representations of the content corresponding to the advanced developmental stage.

In an operation 408, a prompt or other generated display (e.g., generated display 1100 of FIG. 11) is generated. The prompt includes the content representations generated in the operation 406. The prompt provides the guardian the option to allow the child user to specify a greater developmental stage thereby resulting in content representations corresponding to the greater developmental stage being shown to the child user in the generated display 500.

As described herein, systems and methods to generate a display for presenting representations of content to a user based on a determined developmental stage of the user are provided. The content representations are selected by comparing a developmental stage of the user to content metadata tags that indicate an age of a target user and a relevance to the age. Representations of the selected content and other functional display elements are generated based on the developmental stage of the user. The resulting display changes as the user's determined developmental stage changes thereby providing a more inviting and cohesive user experience.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of presenting content to users, the method comprising:
    determining a developmental stage of a user that comprises a contiguous range of discrete ages;
    obtaining a viewing history of the user that identifies content previously displayed to the user;
    selecting a set of tagged content items based on the developmental stage and the viewing history; and
    generating a graphical user interface (GUI) for display on a client device and including the set of tagged content items based on the developmental stage by:
        for each tagged content item in the set of tagged content items, selecting an age-appropriate graphical representation of the tagged content item from a plurality of graphical representations of the tagged content item based on the developmental stage, wherein each representation of the tagged content item included in the plurality of representations has a different level of visual detail determined to be appropriate for a corresponding developmental stage,
        for each age-appropriate representation, determining, based on the developmental stage, a size and a position of the age-appropriate representation in a graphical layout relative to every other age-appropriate representation, wherein a distance between each pair of neighboring age-appropriate representations in the graphical layout is set according to a first rule, and wherein the first rule specifies that the distance between each pair of neighboring age-appropriate representations is indirectly proportional to the developmental stage, and
        generating a visual display of the age-appropriate representations based on the graphical layout.

2. The method of claim 1, wherein determining the developmental stage of the user further comprises receiving an indication of the developmental stage of the user via a functional element included in the display provided to the client device.

3. The method of claim 2, wherein the functional element defines a range of developmental stages and wherein the functional element further comprises an adjustable range limit element setting a limit, within the range, of the indication of the developmental stage of the user.

4. The method of claim 1, wherein the functional element defines a range of developmental stages and wherein the method further comprises advancing the range of developmental stages to include an advanced developmental stage by:
    selecting additional instances of tagged content items based on the advanced developmental stage;
    generating representations of at least one of the additional instances;
    generating a prompt for a guardian to advance the range of developmental stages to include the advanced developmental stage, the representations of the at least one of the additional instances included in the prompt; and
    providing the prompt to the client device.

5. The method of claim 1, wherein determining the developmental stage of the user is based on the viewing history of the user.

6. The method of claim 1, further comprising obtaining an operating context of the user, wherein the operating context comprises at least one of a time of day, geographical location, and an identifier of the client device when content is consumed.

7. The method of claim 1, wherein the age-appropriate graphical representations of the set of tagged content items have a color, a shape or a size appropriate for the developmental stage.

8. The method of claim 1, wherein the age-appropriate graphical representations of the set of tagged content items have text appropriate for the developmental stage.

9. The method of claim 1, wherein the GUI includes a text search box.

10. The method of claim 1, wherein the GUI includes a character bar having a plurality of character representations appropriate for the developmental stage.

11. The method of claim 1, further comprising tagging the set of tagged content items content with one or more metadata tags indicating a target consumer age and a relevance of the content to the target consumer age, resulting in the tagged content.

12. A system comprising:
a developmental stage determination module configured to:
determine a developmental stage of a user, the developmental stage being a contiguous range of discrete ages, and obtain a viewing history of the user, the viewing history identifying content previously displayed to the user;
a content selection module configured to:
select a set of tagged content items based on the developmental stage and the viewing history;
a content representation selection module configured to select, for each tagged content item in the set of tagged content items, an age-appropriate graphical representation of the tagged content item from a plurality of graphical representations of the tagged content item based on the developmental stage, wherein each representation of the tagged content item included in the plurality of representations has a different level of visual detail determined to be appropriate for a corresponding developmental stage; and
a layout module configured to:
for each age-appropriate representation, determining, based on the developmental stage, a size and a position of the age-appropriate representation in a graphical layout relative to every other age-appropriate representation, wherein a distance between each pair of neighboring age-appropriate representations in the graphical layout is set according to a first rule, and wherein the first rule specifies that the distance between each pair of neighboring age-appropriate representations is indirectly proportional to the developmental stage, and
generate a display on a client device of the selected content based on the representations and the graphical layout.

13. The system of claim 12, wherein the developmental stage determination module is configured to generate a functional element included in the display provided to the client device, the functional element including depictions of two or more developmental stages and an option to set the determined developmental stage.

14. The system of claim 13, wherein the developmental stage determination module is further configured to generate an adjustable range limit element on the functional element to set a limit on a range of developmental stages.

15. The system of claim 12, wherein the developmental stage determination module is configured to determine the developmental stage of the user based on the viewing history of the user.

16. The system of claim 12, further comprising a character bar module configured to generate a character bar having a plurality of character representations appropriate for the developmental stage.

17. The system of claim 12, further comprising a stage advancement module configured to:
select additional instances of tagged content based on an advanced developmental stage;
generate representations of at least one of the additional instances; and
generate a prompt for a guardian to advance a pre-defined range of developmental stages of the user to include the advanced developmental stage, the representations of the at least one of the additional instances included in the prompt; and providing the prompt to the client device.

18. The system of claim 12, further comprising a tagging module configured to tag the set of tagged content with one or more metadata tags indicating a target consumer age and a relevance of the content to the target consumer age.

19. A non-transitory computer-readable medium having instructions embodied thereon, the instructions executable by one or more processors to perform operations comprising:
determining a developmental stage of a user that comprises a contiguous range of discrete ages;
obtaining a viewing history of the user that identifies content previously displayed to the user;
selecting a set of tagged content items based on the developmental stage and the viewing history; and
generating a graphical user interface (GUI) for display on a client device and including the set of tagged content items based on the developmental stage by:
for each tagged content item in the set of tagged content items, selecting an age-appropriate graphical representation of the tagged content item from a plurality of graphical representations of the tagged content item based on the developmental stage, wherein each representation of the tagged content item included in the plurality of representations has a different level of visual detail determined to be appropriate for a corresponding developmental stage,
for each age-appropriate representation, determining, based on the developmental stage, a size and a position of the age-appropriate representation in a graphical layout relative to every other age-appropriate representation, wherein a distance between each pair of neighboring age-appropriate representations in the graphical layout is set according to a first rule, and wherein the first rule specifies that the distance between each pair of neighboring age-appropriate representations is indirectly proportional to the developmental stage, and
generating a visual display of the age-appropriate representations based on the graphical layout.

* * * * *